(12) United States Patent
Goodwin, III et al.

(10) Patent No.: US 7,675,503 B2
(45) Date of Patent: Mar. 9, 2010

(54) METHOD OF DISPLAYING INFORMATION BY A NETWORK KIOSK

(75) Inventors: John C. Goodwin, III, Suwanee, GA (US); John Brian Francis, Alpharetta, GA (US)

(73) Assignee: NCR Corporation, Dayton, OH (US)

( * ) Notice: Subject to any disclaimer, the term of this patent is extended or adjusted under 35 U.S.C. 154(b) by 1172 days.

(21) Appl. No.: 09/727,290

(22) Filed: Nov. 29, 2000

(65) Prior Publication Data

US 2002/0063679 A1    May 30, 2002

(51) Int. Cl.
    *G09G 5/00* (2006.01)
(52) U.S. Cl. .............. 345/156; 345/473; 345/905; 705/14.37; 705/14.4; 715/700; 340/5.91
(58) Field of Classification Search ........... 345/156, 345/473, 474, 80, 100, 905; 463/20; 705/14.37, 705/14.4; 700/238; 235/379; 715/700; 340/5.91
    See application file for complete search history.

(56) References Cited

U.S. PATENT DOCUMENTS

| 4,384,288 | A |   | 5/1983  | Walton              |         |
|-----------|---|---|---------|---------------------|---------|
| 5,221,838 | A |   | 6/1993  | Gutman et al.       |         |
| 5,280,159 | A |   | 1/1994  | Schultz et al.      |         |
| 5,367,289 | A |   | 11/1994 | Baro et al.         |         |
| 5,448,226 | A |   | 9/1995  | Failing, Jr. et al. |         |
| 5,477,215 | A |   | 12/1995 | Mandelbaum          |         |
| 5,504,675 | A | * | 4/1996  | Cragun et al. .............. | 705/14 |
| 5,583,487 | A |   | 12/1996 | Ackerman et al.     |         |
| 5,635,915 | A |   | 6/1997  | Gray                |         |
| 5,640,002 | A |   | 6/1997  | Ruppert et al.      |         |
| 5,710,416 | A |   | 1/1998  | Belknap et al.      |         |
| 5,729,697 | A |   | 3/1998  | Schkolnick et al.   |         |
| 5,763,867 | A |   | 6/1998  | Main et al.         |         |
| 5,800,229 | A | * | 9/1998  | Peterson ...................... | 441/129 |
| 5,913,019 | A | * | 6/1999  | Attenberg ................... | 358/1.18 |
| 5,923,252 | A |   | 7/1999  | Sizer et al.        |         |
| 6,008,807 | A | * | 12/1999 | Bretschneider et al. ..... | 345/732 |
| 6,076,068 | A |   | 6/2000  | Delapa et al.       |         |
| 6,078,848 | A | * | 6/2000  | Bernstein et al. ............ | 700/237 |
| 6,098,879 | A |   | 8/2000  | Terranova           |         |
| 6,129,274 | A |   | 10/2000 | Suzuki              |         |
| 6,163,822 | A | * | 12/2000 | Christian et al. .............. | 710/58 |
| 6,179,206 | B1|   | 1/2001  | Matsumori           |         |
| 6,256,046 | B1| * | 7/2001  | Waters et al. ............... | 345/473 |
| 6,280,544 | B1|   | 8/2001  | Fox et al.          |         |
| 6,282,516 | B1|   | 8/2001  | Giuliani            |         |
| 6,286,029 | B1| * | 9/2001  | Delph ........................ | 709/203 |
| 6,315,197 | B1| * | 11/2001 | Beardsley ................... | 235/381 |
| 6,368,216 | B1| * | 4/2002  | Hedrick et al. ................ | 463/20 |
| 6,369,908 | B1| * | 4/2002  | Frey et al. .................. | 358/1.15 |
| 6,408,278 | B1| * | 6/2002  | Carney et al. ................. | 705/14 |

(Continued)

FOREIGN PATENT DOCUMENTS

WO    WO 98/09262    3/1998

*Primary Examiner*—Abbas I Abdulselam
(74) *Attorney, Agent, or Firm*—Paul W. Martin

(57) ABSTRACT

A method of displaying information by a network kiosk which causes different information to be displayed when someone passes within a predetermined distance of the kiosk. The method includes the steps of sensing a person within a predetermined distance of the kiosk, displaying first information, timing a time period, and displaying second information if the person did not begin use of the kiosk within the time period.

9 Claims, 3 Drawing Sheets

U.S. PATENT DOCUMENTS

| | | | |
|---|---|---|---|
| 6,456,981 B1 * | 9/2002 | Dejaeger et al. | 705/14 |
| 6,494,776 B1 * | 12/2002 | Molbak | 453/32 |
| 6,512,498 B1 * | 1/2003 | Favalora et al. | 345/30 |
| 6,571,279 B1 | 5/2003 | Herz et al. | |
| 6,624,843 B2 * | 9/2003 | Lennon | 348/61 |

* cited by examiner

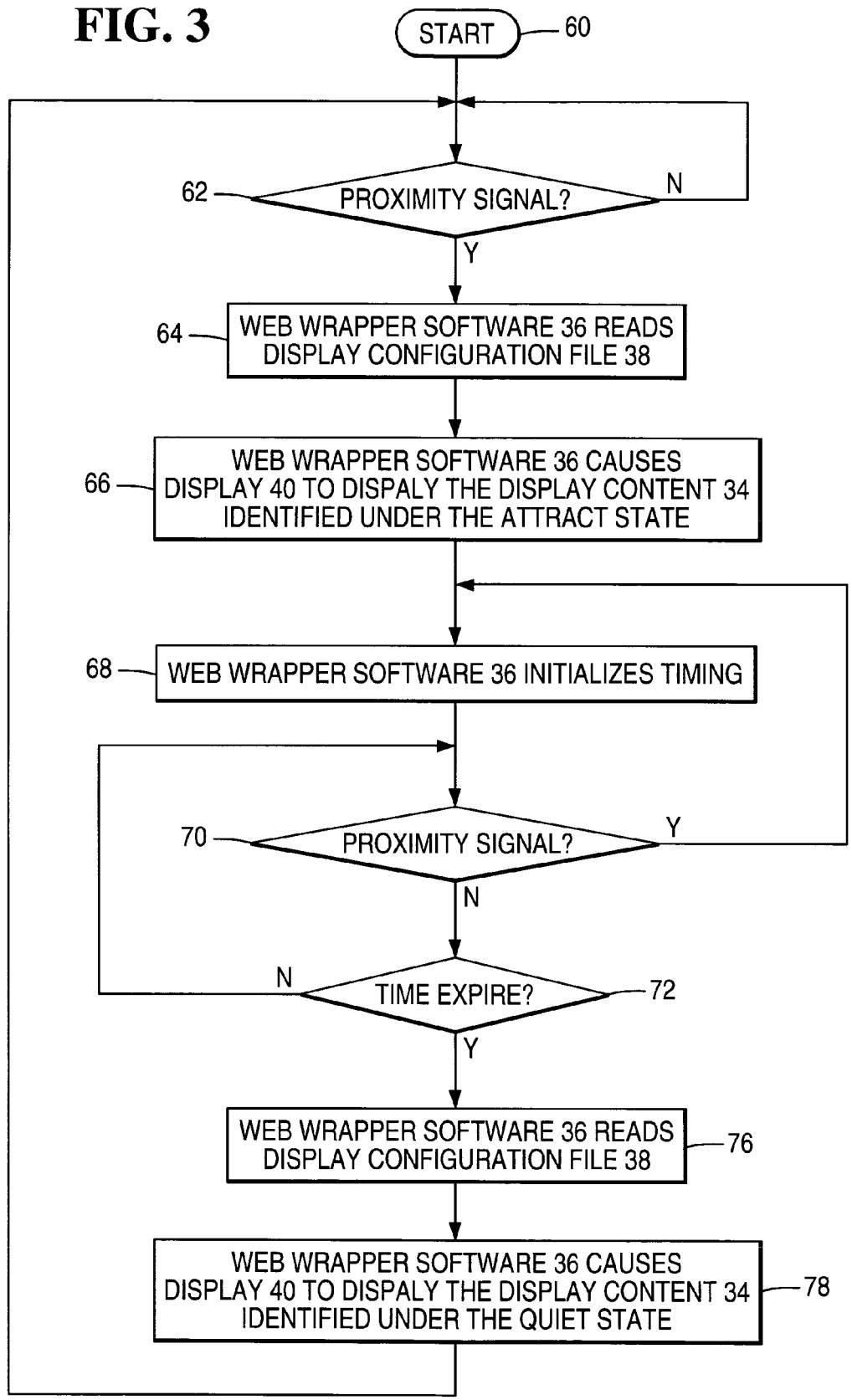

METHOD OF DISPLAYING INFORMATION BY A NETWORK KIOSK

BACKGROUND OF THE INVENTION

The present invention relates to self-service kiosks and more specifically to a method of displaying information by a network kiosk.

Retailers have a desire to sell their products over networks, such as global networks which are a part of the World Wide Web (WWW or "web") and which use the Transmission Control Protocol/Internet Protocol (TCP/IP protocol). These retailers wish to provide Internet server web sites which offer the same features as Internet server web sites available to home shoppers who use their computers to connect to the Internet server web sites.

Kiosks provide a publicly-accessible computing platform for displaying web pages from retailer web sites. Kiosks may be located within a retailer's transaction establishment or elsewhere, such as in shopping malls. Kiosks may be easily networked to retailer web sites using the TCP/IP protocol. Web pages from web sites may be displayed using known and available web software, such as Microsoft® Internet Explorer software.

When not in use, a network kiosk may be configured to display advertisements and other attracting information. The kiosk stops the display when an operator begins use of the kiosk.

It would be advantageous instead for the kiosk to sense the presence of an operator and automatically display a start or "home" page. It would also be advantageous for the kiosk to display different attracting information at different sensed distances of nearby people.

SUMMARY OF THE INVENTION

In accordance with the teachings of the present invention, a method of displaying information by a network kiosk is provided.

The method includes the steps of sensing a person within a predetermined distance of the kiosk, displaying first information, timing a time period, and displaying second information if the person did not begin use of the kiosk within the time period.

It is accordingly an object of the present invention to provide a method of displaying information by a network kiosk.

It is another object of the present invention to display information which may attract a person to use the kiosk if the person passes within a predetermined distance of the kiosk.

It is another object of the present invention to display first information when a person is within a predetermined distance of the kiosk and second information if the person fails to operate the kiosk within a predetermined period of time.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 3 is a flow diagram illustrating the information display method of the present invention.

DETAILED DESCRIPTION OF THE PREFERRED EMBODIMENT

Figure 1:
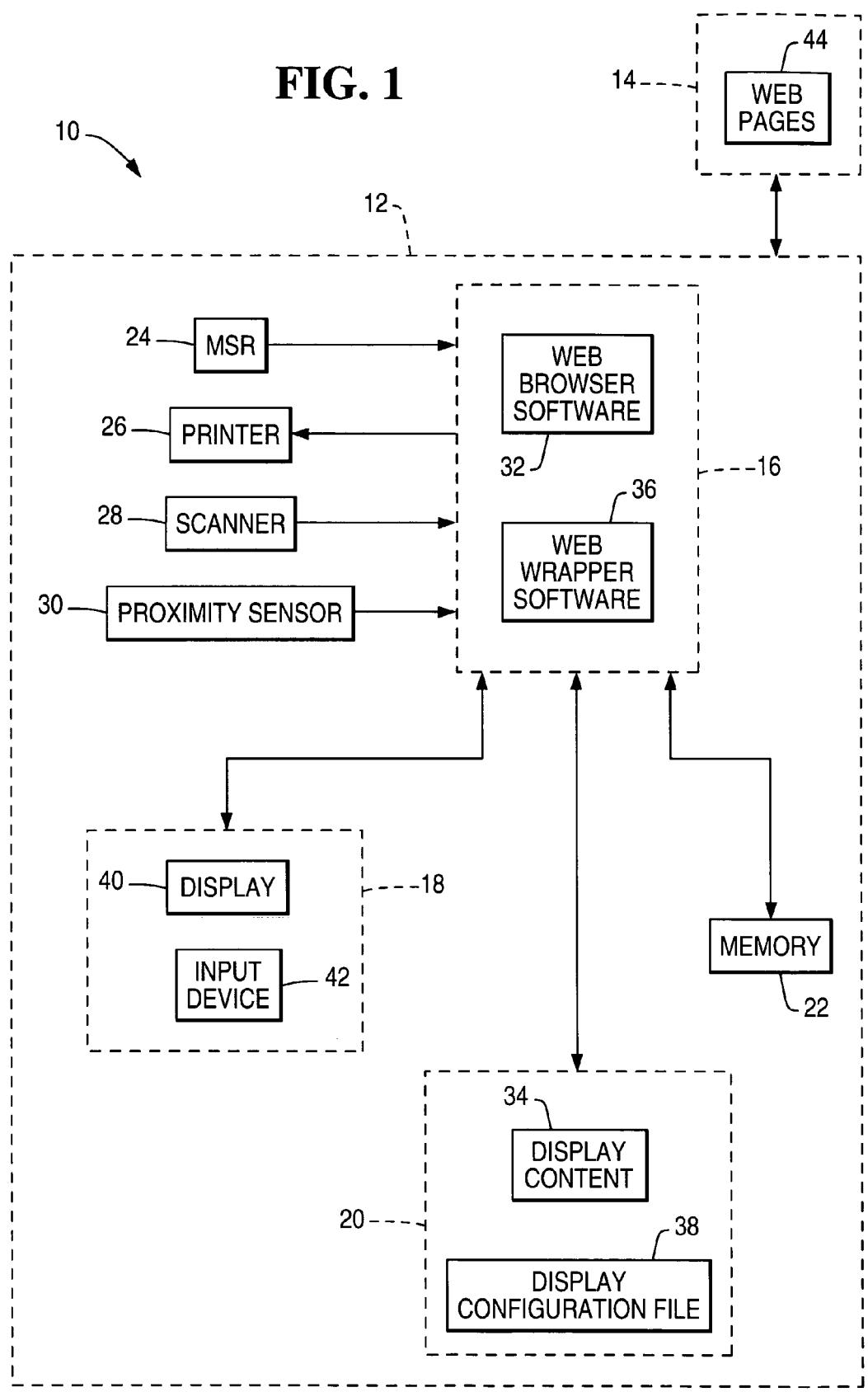
FIG. 1 is a block diagram of a transaction processing system including a network kiosk.

Turning now to FIG. 1, transaction system 10 includes kiosk 12 and network 14. Kiosk 12 is preferably located within a transaction establishment, such as a retail store, or transaction environment, such as a shopping mall. Kiosk 12 may include an NCR 7401 computer.

Kiosk 12 primarily includes processor 16, touch screen 18, memory 20, and storage medium 22. Kiosk 12 may additionally include a number of peripherals, including magnetic strip reader (MSR) 24, printer 26, and scanner 28.

To assist with execution of certain tasks performed by kiosk 12, kiosk 12 includes a built-in time keeping device, commonly referred to as a system clock, which is synchronized with current time, in order to automatically execute the tasks at their scheduled times.

Processor 16 controls operation of kiosk 12 and executes web browser software 32 and web wrapper software 36.

Web browser software 32 allows an operator to access information and purchase products from retailers through network 14, which preferably includes World Wide Web (WWW or "web") servers. Web browser software 32 may include commercially-available web browser software, such as Microsoft® Internet Explorer web browser software. Microsoft® Internet Explorer web browser software is configured into a kiosk operation using a "-k" command line option. This option hides toolbars and menubars to prevent operator access to those functions.

Web browser software 32 retrieves and displays web pages 44 from network 14, which includes a plurality of interconnected servers. Web pages 44 include web pages which display information about products and services offered by the kiosk owner as well as other web pages. Web pages 44 assist operators to find information about products sold by the kiosk owner and to complete purchases of such products. For this purpose, web pages 34 may include a start or "home" page which operates as a default page from which operation begins and to which operation returns when an operator is finished using kiosk 12. Web pages 44 may be written using hypertext markup language (HTML) or other suitable web page language.

Web wrapper software 36 provides security functions. During operation, web wrapper software 36 prevents an operator from accessing kiosk files, other applications, the operating system software, or basic input-output system (BIOS) firmware, and prevents the operator from causing kiosk 12 to reboot.

Under the present invention, web wrapper software 36 additionally manages display of display content 34 while kiosk 12 is not in use. Web wrapper software 36 may cause display 40 to display first information when no one is near kiosk 12 and then switch to second information when a person passes by kiosk 12. Operation may fall back to the first information if kiosk 12 is not operated within a predetermined period of time. Web wrapper software 36 determines display content using display configuration file 38. Display content information may be coded into web wrapper software 36 or listed in display configuration file 38 to allow a kiosk owner to control operation.

The first information may include no information at all, but preferably includes some kind of advertising such as video or still frame advertisements. The advertising may be with or without sound. The advertising may be unfocused on any particular product area.

The second information may include advertising as well, but be more distinctive and attractive to a person passing by.

The advertising may include sound. The advertising may be with or without sound. The advertising may be focused on a particular product area.

Touch screen 18 includes display 40 and input device 42. Display 40 and input device 42 may also be separate units. Input device 42 may record personal information from an operator.

Memory 20 is used by processor 16 to store executed program information, including web wrapper software information.

Storage medium 22 stores software including web wrapper software 36. Storage medium 22 also stores display content 34 and display configuration file 38.

MSR 24 reads loyalty, credit, debit, SMART, and/or other types of cards carried by an operator. MSR 24 may record personal information from an operator.

Printer 26 prints information from web wrapper software 32, including information on web pages 44 from network 14. For example, printer 26 may print information relevant to a transaction completed by an operator using kiosk 12.

Scanner 28 reads bar codes on products to obtain product identification numbers. Kiosk 12 queries a transaction server with the identification numbers to obtain information about the product and displays the information.

Proximity sensor 30 senses motion of people near kiosk 12. Proximity sensor 30 may be an ambient light sensor which senses a drop in ambient light as people pass by kiosk 12.

Figure 2:
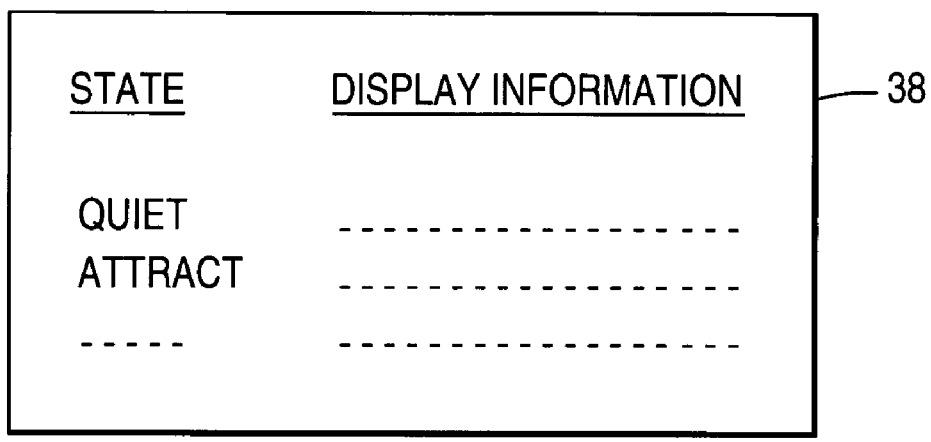
FIG. 2 is a depiction of a display configuration file.

Turning now to FIG. 2, security configuration file 38 includes entries DISPLAY INFORMATION for each state of kiosk 12. Illustrated here are two states, QUIET and ATTRACT.

Entry QUIET identifies a first state entered by kiosk 12 after a predetermined period of non-use.

Entry ATTRACT identifies a second state entered by kiosk 12 after a signal from proximity sensor 30.

Entry DISPLAY INFORMATION describes information from display content 34 which web wrapper software 36 will cause to be displayed during the corresponding state.

Turning now to FIG. 3, the method of the present invention is illustrated beginning with START 60.

In step 62, web wrapper software 36 waits for a proximity signal from proximity sensor 30.

In step 64, web wrapper software 36 reads display configuration file 38 to determine display content 34 to display under the ATTRACT state.

In step 66, web wrapper software 36 causes display 40 to display content 34 for the ATTRACT state.

In step 68, web wrapper software 36 initializes a timeout period.

In step 70, web wrapper software 36 determines whether a signal from proximity sensor 30 has been received since the timeout period was initialized. If so, operation returns to step 68 to reinitialize the timeout period, based upon the assumption that a person is going to use kiosk 12. Continual reinitialization of the time period occurs while the person is using kiosk 12. If a signal from proximity sensor 30 has not been received since the timeout period was last initialized, operation proceeds to step 72.

In step 72, web wrapper software 36 determines whether the timeout period has expired. If not, operation returns to step 70, otherwise, operation proceeds to step 74.

In step 74, web wrapper software 36 reads display configuration file 38 to determine display content 34 to display under the QUIET state.

In step 76, web wrapper software 36 causes display 40 to display content 34 for the QUIET state. Operation returns to step 62 to wait for another proximity signal.

Although the present invention has been described with particular reference to certain preferred embodiments thereof, variations and modifications of the present invention can be effected within the spirit and scope of the following claims.

We claim:

1. A method of displaying information by a network kiosk comprising the steps of:
   sensing a person passing within a predetermined distance of the kiosk by a proximity sensor of the kiosk;
   displaying first information in response to said sensing step by a display of the kiosk to attract attention of the person to the first information of the display and to attempt to persuade the person to approach and use the kiosk;
   timing a time period;
   displaying the first information until an end of the time period by the display if the person does not begin use of the kiosk within the time period; and
   displaying second information which is less distinctive than the first information by the display following the end of the time period.

2. The method of claim 1, further comprising:
   resetting the time period as long as the person is using the kiosk.

3. A method of displaying information by a network kiosk comprising the steps of:
   sensing a person passing within a predetermined distance of the kiosk by a proximity sensor of the kiosk;
   displaying first information in response to said sensing step by a display of the kiosk to attract attention of the person to the first information of the display and to persuade the person to approach and use the kiosk;
   timing a time period;
   displaying the first information until an end of the time period by the display if the person does not begin use of the kiosk within the time period; and
   displaying second information which is less distinctive than the first information by the display if the person is no longer within the predetermined distance of the kiosk and the time period has expired.

4. A method of displaying information by a network kiosk comprising the steps of:
   displaying first information by a display of the kiosk;
   sensing a person passing within a predetermined distance of the kiosk by a proximity sensor of the kiosk;
   displaying second information which is more distinctive than the first information by the display in response to said sensing step to attract attention of the person to the second information of the display and to persuade the person to approach and use the kiosk;
   timing a time period;
   displaying the second information until an end of the time period by the display if the person does not begin use of the kiosk within the time period; and
   displaying third information by the display if the person is no longer within the predetermined distance of the kiosk and the time period has expired.

5. A method of displaying information by a network kiosk comprising the steps of:
   displaying first information by a display of the kiosk;
   sensing a person passing within a predetermined distance of the kiosk by a proximity sensor of the kiosk;
   determining second information for display by the display which is more distinctive than the first information in response to said sensing step;

wherein the second information attracts attention of the person to the second information of the display and to persuade the person to approach and use the kiosk;
displaying the second information by the display;
timing a time period of displaying the second information to wait for the person to operate the kiosk;
displaying the second information until an end of the time period by the display if the person does not begin use of the kiosk within the time period;
determining third information for display which is less distinctive than the second information when the person is no longer within the predetermined distance of the kiosk and the time period has expired; and
displaying the third information by the display.

6. A network kiosk comprising:
a display for displaying information;
a proximity sensor; and
a computer which senses a person passing within a predetermined distance of the kiosk, displays first information in response to sensing the person to attract attention of the person to the first information of the display and to persuade the person to approach and use the kiosk, times a time period of displaying the first information, displays the first information until an end of the time period if the person does not begin use of the kiosk within the time period, and displays second information which is less distinctive than the first information following the end of the time period.

7. A network kiosk comprising:
a display for displaying information;
a proximity sensor; and
a computer which senses a person passing within a predetermined distance of the kiosk, displays first information in response to sensing the person to attract attention of the person to the first information of the display and to persuade the person to approach and use the kiosk, times a time period, displays the first information until an end of the time period if the person does not begin use of the kiosk within the time period, and displays second information which is less distinctive than the first information if the person is no longer within the predetermined distance of the kiosk and the time period has expired.

8. The network kiosk as recited in claim 7, wherein the proximity sensor comprises an ambient light sensor which senses a drop in ambient light when the person is within the predetermined distance.

9. A method of attracting a person to a network kiosk comprising the steps of:
sensing a person passing within a predetermined distance of the kiosk by a proximity sensor of the kiosk;
displaying first information and playing a sound in response to said sensing step to attract attention of the person to the first information of the display and to persuade the person to approach and use the kiosk;
timing a time period;
displaying the first information and playing the sound until an end of the time period by the kiosk if the person does not begin use of the kiosk within the time period; and
displaying second information which is less distinctive than the first information and stopping the sound following the end of the time period.

\* \* \* \* \*